United States Patent [19]

Miller

[11] Patent Number: 4,970,367
[45] Date of Patent: Nov. 13, 1990

[54] LASER WIRE STRIPPER APPARATUS AND METHOD THEREFOR

[76] Inventor: Richard T. Miller, 3210 E. Corrine Dr., Phoenix, Ariz. 85032

[21] Appl. No.: 473,882

[22] Filed: Feb. 2, 1990

[51] Int. Cl.⁵ .............................................. B23K 26/18
[52] U.S. Cl. ........................... 219/121.68; 219/121.69
[58] Field of Search ........... 219/121.6, 121.68, 121.69, 219/121.67, 121.72, 121.84, 121.76

[56] References Cited

U.S. PATENT DOCUMENTS 4,761,535  8/1988  Lawson .......................... 129/121.68
4,808,966  2/1989  Ferlier et al. ............... 219/121.68 X

OTHER PUBLICATIONS

Iceland "Laser Wire Stripping: Equipment and Operation Notes", *Insulation/Circuits*, vol. 26, No. 4, Apr. 1980, pp. 47–50.

*Primary Examiner*—C. L. Albritton
*Attorney, Agent, or Firm*—Harry M. Weiss

[57] ABSTRACT

A laser, wire stripper for removing a selected area of insulation from opposite sides of an insulated wire. The stripper comprises an improved, workpiece support assembly that allows wire to be fed from the sides, a laser with top and bottom focusing heads for vaporizing the insulation, and a ducting assembly for removing gases and debris generated by the vaporization of the insulation.

21 Claims, 3 Drawing Sheets

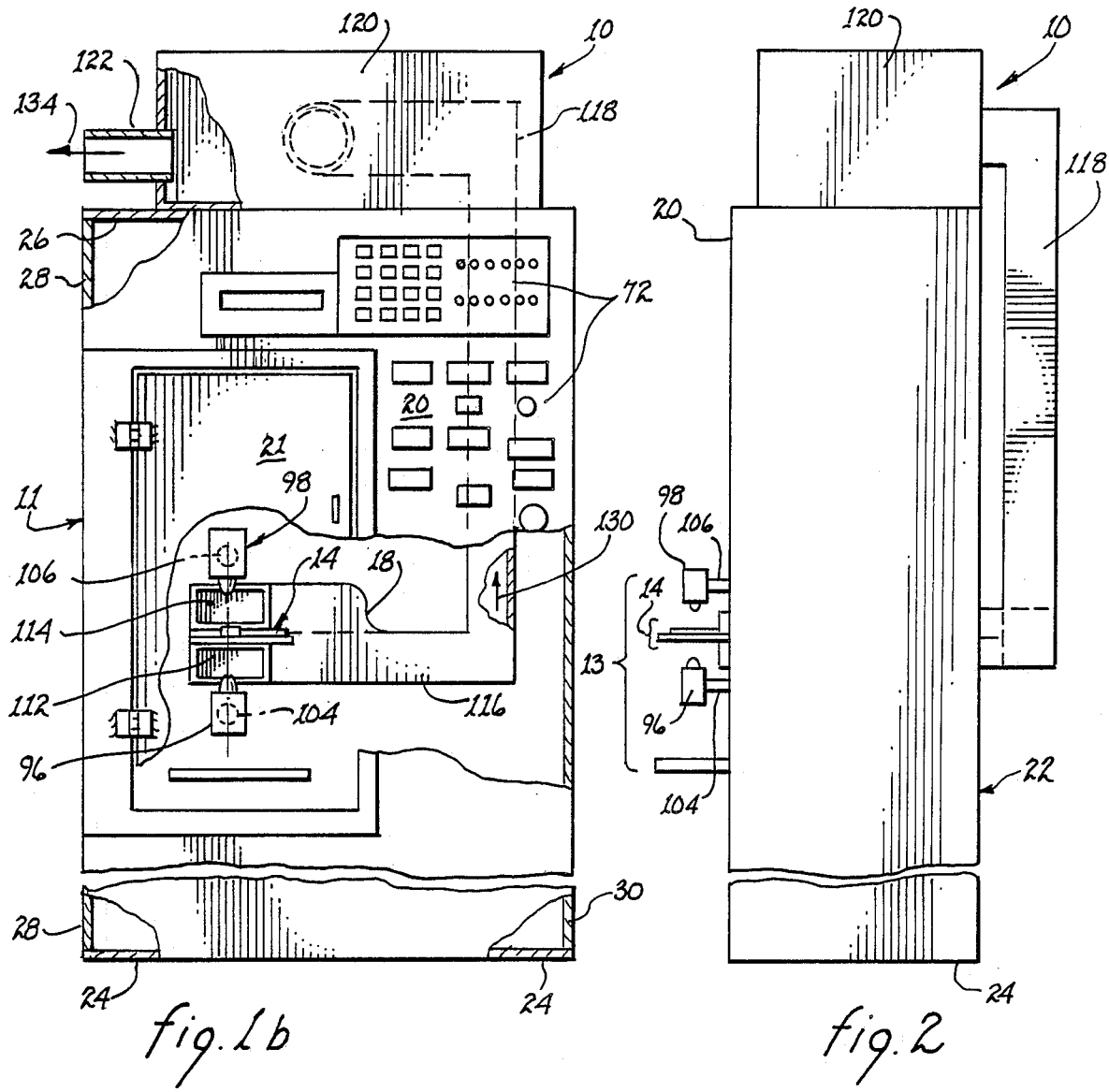
fig. 1b
fig. 2
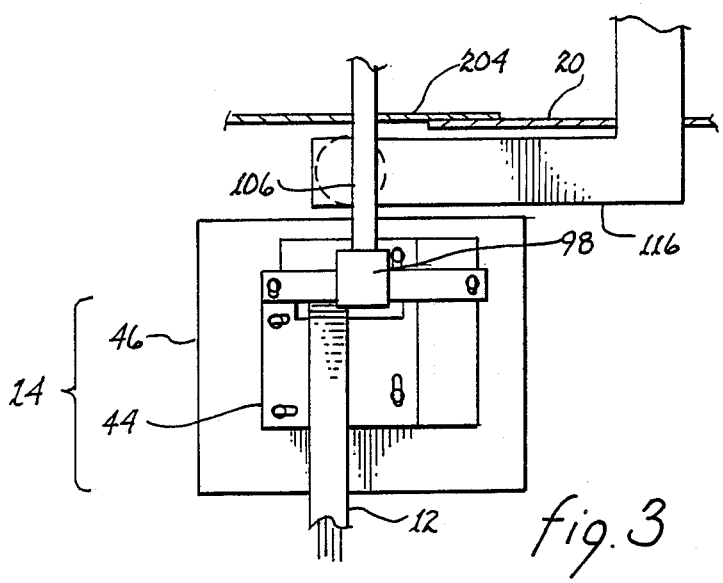
fig. 3
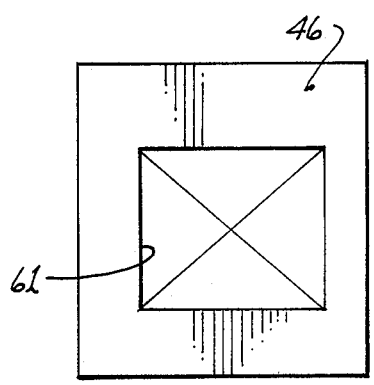
fig. 11

LASER WIRE STRIPPER APPARATUS AND METHOD THEREFOR

BACKGROUND OF THE INVENTION

1. Field of Invention

The invention generally relates to an apparatus and method therefor for removing insulation from wire, and in particular, the invention relates to a laser, wire stripper apparatus and method therefor having an improved workpiece support assembly, a laser with top and bottom focusing heads for vaporizing selected areas of the wire insulation with a high degree of precision, and a ducting assembly for removing gases created by the vaporization of the wire insulation.

2. Description of the Prior Art

Generally, commercially available wire is entirely covered by insulation. To couple the wire to an electrical connector requires the precise removal of insulation from the wire at the exact points where the coupling is to occur. In the past, prior art, wire strippers relied on mechanical cutting devices and scraping devices for removing insulation from wire. More recently, sophisticated techniques have been developed to remove insulation from electrical conducting, (i.e. metal), wires employing lasers to vaporize the insulation.

One earlier prior art laser technique used to remove insulation from metal wire is disclosed in Miller et al., U.S. Pat. No. 4,671,848, filed in the joint names of the inventor of this application and another individual.

One problem with the mechanical type of prior art, wire strippers is that they sometimes damaged the wire. The prior art laser device did not effectively remove the toxic gases and particulate debris generated when insulation is vaporized. Lastly, the prior art, laser device can only remove insulation from the ends of long pieces of wire. Furthermore, the prior art laser device did not have replaceable aperture plates for selecting, as desired, a particular geometry for removal of insulation from the bottom of the wire.

SUMMARY OF THE INVENTION

An object of the subject invention is to provide a laser, wire stripper and method therefor that can remove insulation without damaging the electrical conductor within.

Another object of the subject invention is to provide a laser, wire stripper and method therefor that can remove insulation from the bottom side of the wire without requiring the operator to rotate the workpiece or be limited to a small, fixed area along the bottom of the wire.

Another object of the subject invention is to provide a laser, wire stripper and method therefor through which the workpiece can be fed from the sides of the machine, thereby allowing the stripper to remove insulation from the middle of a long piece of wire.

Another object of the subject invention is to provide a laser, wire stripper and method therefor that has a ducting assembly that removes gases and debris created when the insulation is vaporized by the laser beam.

Another object of the subject invention is to provide a laser, wire stripper and method therefor that is compact and portable.

The subject invention accomplishes these objects by providing a laser, wire stripper and method therefor that has a laser with top and bottom focusing heads which are positionable in an X-Y plane. The laser beam has a wavelength of 10.6 microns which is absorbed by the insulation but reflected by the metal conductor. Thus, the laser beam removes the insulation without damaging the metal conductor within. The focusing heads are computer driven so that the laser beam can be precisely applied at the point where the insulation must be removed. The workpiece support assembly is designed to expose the bottom side of the workpiece to the bottom focusing head. Ducting is provided for the removal of gases and debris generated by the workpiece. This ducting is uniquely positioned so that wire can be fed under the focusing heads from the side of the machine. The laser, wire stripper is packaged to be compact and portable.

The foregoing and other objects, features and advantages will be apparent from the following description of the preferred embodiment of the invention as illustrated in the accompanying drawings.

BRIEF DESCRIPTION OF THE DRAWINGS

FIG. 1b is an enlarged view of a section of FIG. 1a.

FIG. 2 is a side view of the laser wire stripper of FIG. 1b.

FIG. 3 is a top view of the work station of the laser wire stripper of FIG. 1b.

FIG. 11 is a section view taken along the line 11—11 of FIG. 7.

DESCRIPTION OF THE PREFERRED EMBODIMENT

Figure 1A:
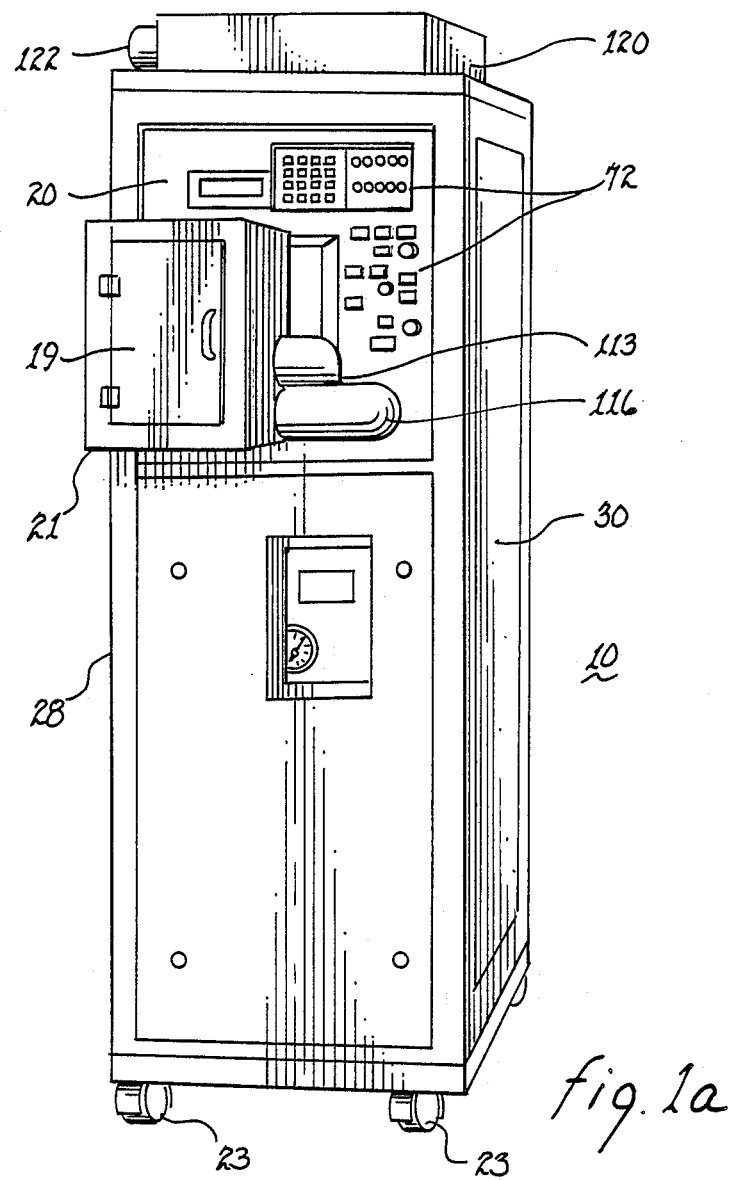
FIG. 1a is a perspective view of a laser, wire stripper apparatus according to the subject invention.

As shown in FIGS. 1a and 1b, a laser, wire stripper 10 is provided. The stripper 10 has a housing or support structure 11, with a work station 13 extending outwardly from the front of the housing 11. The work station 13 is comprised of a workpiece support assembly 14, a pair of laser focusing heads 96, 98, and a ducting assembly 18.

The housing 11 has a front wall 20, a rear wall 22, a bottom wall 24 coupled to four casters 23, a top wall 26, a left side wall 28, a right side wall 30 and a removable cover 21, with a door 19, for protecting the work station 13. A plurality of control panels 72 are disposed upon the front wall 20 for controlling and programing the laser focusing heads 96, 98.

Figure 4:
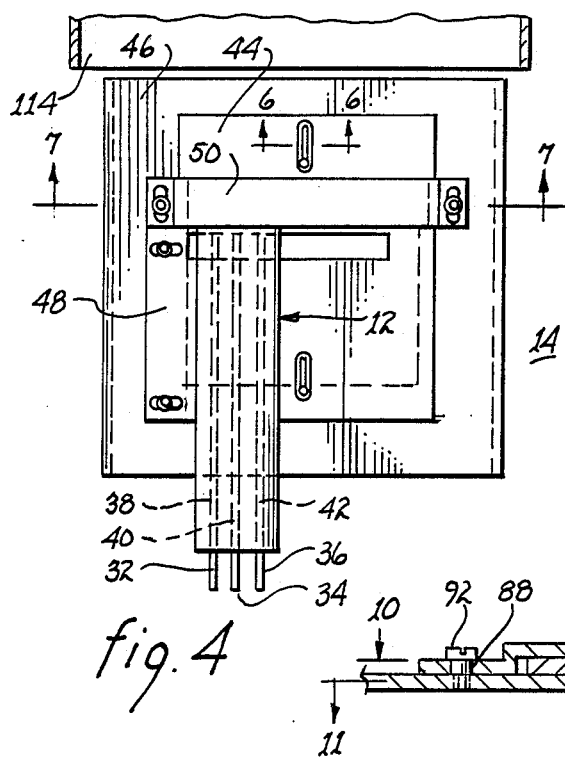
FIG. 4 is an enlarged view of a portion of FIG. 3.
Figure 10:
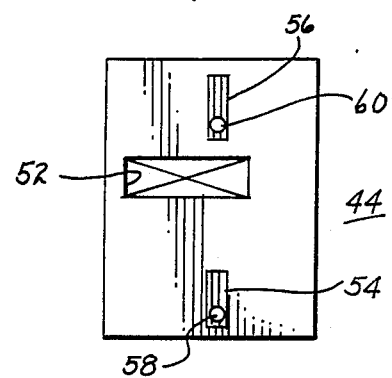
FIG. 10 is a section view taken along line 10—10 of FIG. 7.
Figure 7:
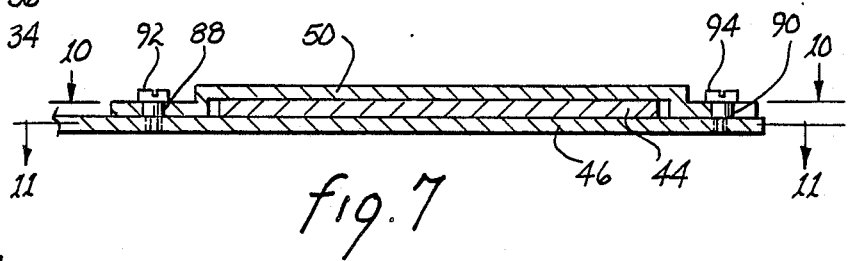
FIG. 7 is a section view taken along the line 7—7 of FIG. 4.

A workpiece 12 consists of one or more pieces of metal conductor entirely enfolded in insulation. As shown in FIG. 4, the workpiece 12 has a plurality of metal wires 32, 34, 36, and an electrical insulation cover with cover portions 38, 40, 42.

Figure 5:
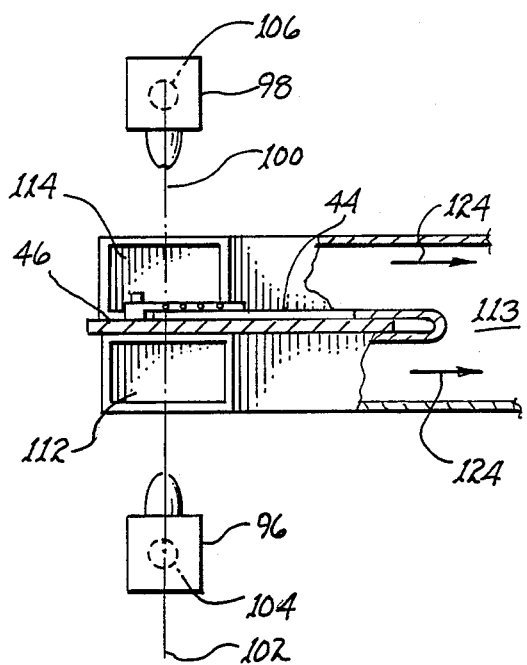
FIG. 5 is a front view of the work station of FIG. 3.
Figure 8:
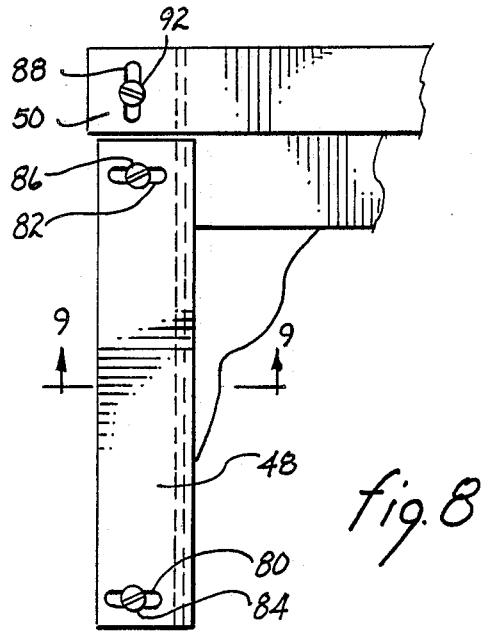
FIG. 8 is an enlarged view of a portion of FIG. 4.
Figure 6:
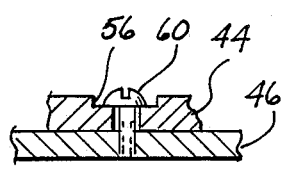
FIG. 6 is a section view taken along the line 6—6 of FIG. 4.

As shown in FIGS. 3 through 11, the workpiece support assembly 14 has a slide plate 44 and a base plate 46. The base plate 46 has an edge stop bar 48 and an end stop bar 50. The slide plate 44 has a cutout or opening 52, and a pair of recessed slotted holes 54, 56 (FIG. 6). The holes 54, 56 have respective bolts or machine screws 58, 60. The base plate 46 has cutout 61 (FIG. 11).

Figure 9:
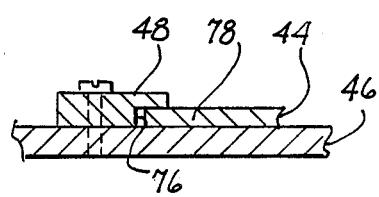
FIG. 9 is a section view taken along the line 9—9 of FIG. 8.

As shown in FIG. 9, the edge stop bar 48 has an underside edge groove 76, which receives a left edge portion 78 of the slide plate 44 for positioning the slide plate 44 in a selected position relative to the base plate 46. The stop bar 48 has a pair of slotted holes 80, 82, which have respective machine screws 84, 86. The end stop bar 50 has a pair of slotted holds 88, 90, which have respective machine screws 92, 94.

As shown in FIG. 5, the work station 13 includes the bottom focusing head 96 and the top focusing head 98, for transmitting a laser beam 100 along an axis 102. The laser beam emanating from either of the focusing heads 96,98 vaporizes the insulation portions 38, 40, 42 from wires 32, 34, 36. The focusing heads 96,98 have respective pipe supports 104, 106, which extend backward through the front wall 20 (see FIG. 2).

As shown in FIGS. 1b, 2, and 5, the ducting assembly 18 has a lower inlet duct 112 and an upper inlet duct 114 which are behind the slide plate 44 (see FIG. 5). The ducts 112,114 merge at a plenum 113. The ducting assembly 18 also has a duct 116 which runs from the plenum 113 along the front wall 20 until it bends an enters the inside of the wire stripper 10. The duct 116 exits out the rear wall 22. A vertical duct 118 runs from the duct 116 to a gas filter 120. The gas filter 120 has an outlet duct 122. The gas flows in a direction 124 through the duct 166, in a direction 130 in the duct 118, and out the gas filter 120 in a direction 134.

Figure 12:
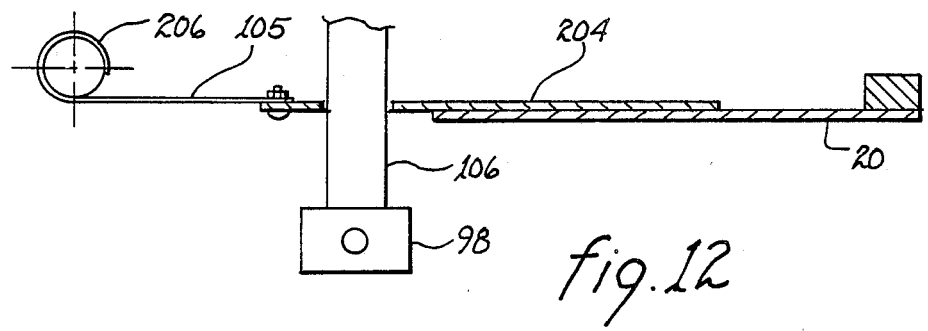
FIG. 12 is an enlarged view of a portion of FIG. 3.

Behind the inlets 112,114 is a section of the front wall 20 having a moveable, preferably plastic wall 204, (see FIG. 12). The upper and lower focusing heads 96,98 pass through the plastic wall 204, (only the top focusing head 98 is shown in FIG. 12). The plastic wall 204 is coupled via a neoprene sheet 105 to a spring loaded spool 206. Thus, as the focusing heads 96,98 move in the X direction, the plastic wall 204 moves along with them preventing debris from entering into the laser stripper 10. As the focusing heads 96, 98 move solely in the Y direction, the focusing heads 96, 98 move together in and out while the plastic wall 204 remains stationary. The fixed wall 20 and the moveable wall 204 are both preferably located inside an upper and lower track (not shown).

The laser, not shown, is preferably a carbon dioxide laser which operates in the far infrared regions of the spectrum at a wavelength of 10.6 microns.

The advantages of the laser, wire stripper 10 are indicated hereafter.
A) The laser, wire stripper 10 selectively removes insulation 38, 40, 42 without damage to wires 32, 34, 36.
B) The computer controlled positioning of the focusing heads 96,98 permits the removal of insulation at precise locations on the workpiece 12.
C) The laser, wire stripper 10 permits the user to remove insulation from all sides of the workpiece 12.
D) The laser, wire stripper 10 permits the continuous feed of wire from the side of the focusing heads 96,98.
E) The laser, wire stripper 10 is compact and portable.

While the invention has been described in its preferred embodiment, it is to be understood that the words which have been used are words of description rather than limitation and that changes may be made within the preview of the appended claims without departing from the true scope and spirit of the invention in its broader aspects.

For example, other configurations of wire can be stripped, such as a twisted wire.

As another example, another type of cutout, such as an L-shaped cutout, can be used instead of rectangular cutout 52 in slide plate 44.

As still another example, the ducting assembly 18 can be connected to existing ducting in a building.

As still another example, the laser assembly 16 can have an optical system with a single, dual, or rotary beam configuration.

I claim:

The embodiments of an invention in which an exclusive property or right is claimed are defined as follows:

1. A laser, wire stripper for removing insulation from selected areas along the top and bottom of an insulated wire without damaging the wire comprising:
    a housing;
    a laser, disposed in said housing, having a plurality of focusing heads extending outwardly from said housing, said focusing heads being positionable in a X-Y plane and at least disposed above and below said wire, said laser generating a laser beam having sufficient energy to vaporize said insulation without damaging said wire; and
    adjustable and moveable workpiece assembly means, disposed between said focusing heads, for holding said wire in the path of a laser beam emanating from any one of said focusing heads.

2. The apparatus of claim 1 further comprising a ducting means for removing gases and debris generated from the vaporization of said insulation.

3. The apparatus of claim 1 wherein said ducting means is disposed behind said workpiece assembly means, thereby allowing said wire to be fed between said focusing heads from the sides of said workpiece assembly means.

4. The apparatus of claim 1 wherein said workpiece assembly means further comprises:
    a base plate having a section cutout; and
    an adjustable slide plate resting on said base plate and having at least one cutout of selected size and shape, said cutout being larger than the projected size and shape of said insulation to be removed, said adjustable slide plate having adjusting means for adjusting the setting of said slide plate relative to said base plate so that said cutout of said slide plate overlaps said cutout of said base plate.

5. The apparatus of claim 4 wherein said base plate further comprises:
    an edge stop bar for setting a position in an X-direction of said wire relative to said slide plate and for setting a position of said slide plate relative to said base plate; and
    an end stop bar for setting a position in a Y-direction of said wire relative to said slide plate and for setting a position of said slide plate relative to said base plate.

6. The apparatus of claim 5 wherein said edge stop bar and said end stop bar each has a pair of slotted holes, each of said stop bar slotted holes having a machine screw connected to said base plate.

7. The apparatus of claim 6 wherein said slide plate further comprises a pair of recessed slotted holes having respective machine screws connected to said base plate.

8. The apparatus of claim 1 further comprising a computer means for precisely positioning said focusing heads in the X-Y plane.

9. The apparatus of claim 3 wherein said ducting means further comprises a lower inlet disposed below said base plate and an inlet disposed above said slide plate.

10. The apparatus of claim 9 wherein said ducting means further comprises a filter disposed atop said housing and a plurality of ducts coupling said inlets to said filter.

11. The apparatus of claim 1 wherein said laser beam has a wavelength of about 10.6 microns.

12. The apparatus of claim 1 wherein said laser is a carbon dioxide laser.

13. A process, for removing insulation from selected areas along the top and bottom of an insulated wire, comprising the steps of:
   mounting said insulated wire on an adjustable and moveable workpiece assembly;
   adjusting and moving said workpiece assembly until said selected area along said bottom is exposed;
   positioning a laser focusing head, above and below said selected areas, along a common axis;
   generating a laser beam at sufficient energy levels to vaporize said insulation from said wire;
   selecting one of said focusing heads; and
   passing said laser beam through said selected focusing head, thereby vaporizing said insulation from said selected area.

14. The process of claim 13 further comprising the step of removing gases and debris generated by said vaporization of said insulation simultaneously with said vaporization.

15. A laser, wire stripper for removing insulation from selected areas along the top and bottom of an insulated wire without damaging the wire comprising:
   a housing;
   a laser, disposed in said housing, having a plurality of focusing heads extending outwardly from said housing, said focusing heads being positionable in a X-Y plane and at least disposed above and below said wire, said laser generating a laser beam having sufficient energy to vaporize said insulation without damaging said wire;
   workpiece assembly means, disposed between said focusing heads, for holding said wire in the path of a laser beam emanating from any one of said focusing heads; and ducting means located above and below said workpiece assembly means for removing gases and debris generated from the vaporization of said insulation.

16. The apparatus of claim 15 wherein said ducting means is disposed behind said workpiece assembly means, thereby allowing said wire to be fed between said focusing heads from the sides of said workpiece assembly means.

17. The apparatus of claim 16 wherein said workpiece assembly means having adjustable and moveable means for adjusting the area of exposure of the wire to said laser focusing heads.

18. A laser, wire stripper for removing insulation from selected areas along the top and bottom of an insulated wire without damaging the wire comprising:
   a housing;
   a laser, disposed in said housing, having a plurality of focusing heads extending outwardly from said housing, said focusing heads being positionable in a X-Y plane and at least disposed above and below said wire, said laser generating a laser beam having sufficient energy to vaporize said insulation without damaging said wire;
   workpiece assembly means, disposed between said focusing heads, for holding said wire in the path of a laser beam emanating from any one of said focusing heads; and moveable wall means coupled to said laser focusing heads for permitting said laser focusing heads to jointly move together in a Y direction while said moveable wall means remains stationery with respect to said moving laser focusing heads and for moving with said laser focusing heads in the X direction, along with said moveable wall.

19. The apparatus of claim 1 further comprising a ducting means for removing gases and debris generated from the vaporization of said insulation.

20. The apparatus of claim 19 wherein said ducting means comprising a pair of ducts in the one of said pair being above said workpiece assembly means and the other of said pair being below said workpiece assembly means.

21. The apparatus of claim 18 wherein said workpiece assembly means having adjustable means for adjusting the area of exposure of the wire to said laser focusing heads.

* * * * *